United States Patent [19]

Ryan

[11] Patent Number: 5,151,335
[45] Date of Patent: Sep. 29, 1992

[54] CATHODE MATERIAL FOR ELECTROCHEMICAL CELLS

[75] Inventor: David M. Ryan, Beavercreek, Ohio

[73] Assignee: The United States of America as represented by the Secretary of the Air Force, Washington, D.C.

[21] Appl. No.: 834,731

[22] Filed: Jul. 29, 1991

[51] Int. Cl.$^5$ .................. H01M 4/24; H01M 6/14
[52] U.S. Cl. .................. 429/223; 429/194; 429/218
[58] Field of Search .................. 429/218, 223, 194; 252/182.1

[56] References Cited

U.S. PATENT DOCUMENTS

| | | | |
|---|---|---|---|
| 3,930,888 | 1/1976 | Bowser et al. | 136/120 R |
| 4,117,207 | 9/1978 | Nardi et al. | 429/103 |
| 4,301,221 | 11/1981 | Basu et al. | 429/218 |
| 4,315,905 | 2/1982 | Bens et al. | 423/592 |
| 4,508,796 | 4/1985 | Delnick et al. | 429/112 |
| 4,596,752 | 6/1986 | Faul et al. | 429/103 |
| 4,764,438 | 8/1988 | Vaughn et al. | 429/52 |

FOREIGN PATENT DOCUMENTS 214280 12/1983 Japan .................. 429/194

Primary Examiner—John S. Maples
Attorney, Agent, or Firm—Charles E. Bricker; Donald J. Singer

[57] ABSTRACT

There is provided a primary cell having an anode material, an electrolyte material and a cathode material, wherein the cathode material, in the pre-discharge condition thereof, is $K_7(NiV_{13}O_{30})$. In one aspect, the invention comprises a thermal cell having a lithium metal or lithium alloy anode, an electrolyte material comprising at least one lithium salt and the aforementioned cathode material. In another aspect, the invention comprises an improved conventional room or ambient temperature cell having a lithium anode, a nonaqueous electrolyte and the aforementioned cathode material.

13 Claims, No Drawings

CATHODE MATERIAL FOR ELECTROCHEMICAL CELLS

RIGHTS OF THE GOVERNMENT

The invention described herein may be manufactured and used by or for the Government of the United States for all governmental purposes without the payment of any royalty.

BACKGROUND OF THE INVENTION

The present invention relates to electrochemical cells and primarily to cells having a lithium metal or lithium alloy anode.

Thermal cells are primary electrochemical cells having an anode, a cathode and an electrolyte that is solid and non-conductive at ambient temperatures. The cell is activated by providing sufficient heat to melt the electrolyte which thereby becomes conductive. Thermal batteries are made up of a plurality of thermal cells. These batteries conventionally include a heat source, generally an ignitable, exothermically reactive chemical charge or pyrotechnic.

Thermal batteries are normally used to generate a single continuous energy output, once activated. The duration of the output may vary from a few seconds to an hour, depending on the battery design and construction. These batteries are frequently used as power sources for guided missiles and other weapons systems.

A variety of electrochemical systems are known for use in thermal cells. Known anode materials include the alkali metals and their alloys, alkaline earth metals and their alloys and aluminum. The electrolytes are generally mixtures of alkali metal halides, commonly a eutectic mixture of LiCl and KCl melting at about 352° C., although other fusible salt mixtures have been used, such as alkali metal thiocyanates, as well as solid electrolytes, such as the alkali metal aluminum chlorides. Suitable active cathode materials that are reduced in the electrochemical cell reaction include phosphates, metal oxides, borates and chromates. The terms cathode, depolarizer and depolarized cathode are frequently used in discussions of battery technology. Hereinafter only the term "cathode" will be used, and will be understood to embrace the meanings carried by any of these terms.

Lithium is an attractive anode because of its reactivity, light weight and high voltage (between 1.6 and 3.6 volts, depending on the cathode material). The advantages of lithium include high energy density, flat discharge characteristics, and good shelf life.

Known thermal batteries usually employ the following cell construction (although other cell constructions are known). The anode is provided by a layer of lithium either in the form of the pure metal held in a support (since the metal is liquid in the thermally activated state) or in the form of an alloy, e.g., with boron, silicon or aluminum. The electrolyte is a pressed powder pellet comprising a eutectic mixture of LiCl and KCl, or of LiF, LiCl and LiBr. The electrolyte is admixed with an inert binder such as MgO to immobilize it when molten.

Several cells are arranged in a stack, each cell having its own pyrotechnic pellet. The stack is assembled in a dry atmosphere and is enclosed by material providing a thermal blanket. The enclosed stack is then hermetcially sealed within a steel case.

The common cathode materials known to be used in thermal batteries are $CaCrO_4$, $V_2O_5$ and $FeS_2$. Of these, $CaCrO_4$ and $V_2O_5$ are soluble in molten LiCl/KCl eutectic. Therefore, a portion of the active cathode material must be expended in the formation of a separator layer to prevent self discharge. Cathodes of these materials are also subject to concentration polarization in the course of discharge.

$FeS_2$ is insoluble in the LiCl/KCl eutectic, hence avoiding the two difficulties mentioned above. $FeS_2$, however, possesses limited thermal stability, undergoing thermal decomposition in LiCl-KCl eutectic at about 550° C.

Conventional room or ambient temperature cells having lithium anodes are also known. Such cells have the advantages given previously.

Nonaqueous solvents are used as the electrolyte because of the solubility of lithium in aqueous solutions. Organic solvents, such as acetonitrile and propylene carbonate, and inorganic solvents, such as thionyl chloride, sulfuryl chloride and sulfur dioxide, are typical. A compatible solute is added to provide the necessary electrolyte conductivity. A number of different materials, e.g., sulfur dioxide, carbon monofluoride, vanadium pentoxide, manganese dioxide, copper sulfide, and the like, have been used as the active cathode material.

It is therefore an object of the present invention to provide a novel cathode material for thermal cells.

It is another object of the present invention to provide a novel cathode material for conventional lithium cells.

Other objects, aspects and advantages of the present invention will become apparent to those skilled in the art from a reading of the following detailed description of the invention.

SUMMARY OF THE INVENTION

In accordance with the present invention, there is provided a primary cell having an anode material, an electrolyte material and a cathode material, wherein the cathode material, in the pre-discharge condition thereof, is $K_7(NiV_{13}O_{30})$.

In one aspect, the invention comprises a thermal cell having a lithium metal or lithium alloy anode, an electrolyte material comprising at least one lithium salt and the aforementioned cathode material.

In another aspect, the invention comprises an improved conventional room or ambient temperature cell having a lithium anode, a nonaqueous electrolyte and the aforementioned cathode material.

In the thermal cell, the anode may be a known lithium based anode, e.g., comprising pure lithium held in a known container or support, or comprising a suitable known lithium alloy, e.g., containing one or more of boron, silicon or aluminum.

The anode material may optionally be mixed with electrolyte or contacted by electrolyte contained in a pad. The content of lithium in the anode material, excluding any electrolyte present, is generally about 5 to 85 weight percent, depending on the manner in which the lithium is contained.

If the lithium is contained in an unalloyed state, it preferably forms about 5 to 30% of the overall weight of support material in which it is contained. Such support material may be an inert matrix, such as an iron mesh or a porous nickel/chromium matrix. Typically, the lithium forms 7 to 8% by weight of such anode materials.

If the lithium in the anode material is provided in the form of an alloy, it is preferably selected from (1) lithium-aluminum alloys containing about 20 to 50 weight percent lithium, balance aluminum, (2) lithium-silicon alloys containing about 44 to 56 weight percent lithium, balance silicon, and (3) lithium-boron alloys containing about 53 to 80 weight percent lithium, balance boron.

Suitable electrolytes include the solid electrolytes, such as the alkali metal aluminum chlorides, and liquid electrolytes. The liquid electrolyte should have a melting point less than 650° C., preferably about 300° to 500° C. Suitable liquid electrolytes include LiCl/KCl eutectic (m.p. 364° C.), LiF/LiCl/LiBr eutectic (m.p. 450° C.), and LiBr/KBr eutectic (m.p. 348° C.).

In the room temperature cell, the anode is generally lithium foil. The electrolyte is a nonaqueous solvent, such as acetonitrile or propylene carbonate, saturated with a lithium salt, such as LiBr or $LiAsF_6$.

In both the thermal cell and the room temperature cell, the cathode is made of finely divided $K_7(NiV_{13}O_{30})$. The $K_7(NiV_{13}O_{30})$ may be prepared by as described in Example I, below. The resulting crystals are then filtered, washed with water and dried. In the thermal cell, the cathode material is admixed with electrolyte material prior to pressing the cathode into its disk or pellet form.

In both the thermal cell and the room temperature cell, the selection of the electrolyte and the anode, as well as cell construction, is conventional as will be obvious to those skilled in the art.

The following examples illustrate the invention:

EXAMPLE i

Preparation of $K_7(NiV_{13}O_{30})$

Potassium vandate, $KVO_3$ (35.9 g, 0.26 mol), was dissolved in 1000 ml of water. To the solution was added 20 ml of 0.1M nitric acid, followed by 20 ml 1M $NiSO_<$ and 10.8 g (40 mmol) of $K_2S_2O_8$. The reaction mixture was stirred for 5 hours at 80° C., during which time the color changed to a dark red-brown. The solution was filtered and treated with 40 ml 1M potassium acetate. After standing overnight, the dark red crystals were filtered, washed with 0.5 M potassium acetate/0.1 M acetic acid buffer, then dried under vacuum at room temperature.

TGA of samples of the $K_7(NiV_{13}O_{30})$ indicate that the material dried under vacuum is $K_7(NiV_{13}O_{30})\cdot6\text{-}H_2O$. The TGA curve of this material displays loss of water in one step at 290° C.

EXAMPLE II

Cells were constructed using a 1.5 g 28 wt. % LiAl anode, 3 g of LiCl/KCl eutectic with a binder as the electrolyte and a 3 g pellet of $K_7(NiV_{13}O_{30})$, admixed 1:1 with electrolyte material, as the cathode. The cells were heated to the temperatures (° C.) shown in Table I, below, under argon, and discharged through a constant current load, expressed in amps. In the Table, the term Current is expressed in amperes, $V_p$ means peak voltage, expressed in volts, $t_n$ means the active life of the cell from initiation to n% of $V_p$, expressed in seconds, and $ED_n$ means energy density of the cell over the period $t_n$, expressed in watt-hr/kg.

For comparison, cells comprising known cathode materials were also constructed and tested. Their data are given in Table II, wherein the header units have the same meaning as in Table I.

TABLE I

| Cathode | Temp | Current | $V_p$ | $t_{90}$ | $t_{80}$ | $t_{70}$ | $ED_{90}$ | $ED_{80}$ | $ED_{70}$ |
|---|---|---|---|---|---|---|---|---|---|
| $K_7(NiV_{13}O_{30})$ | 400 | 0.93 | 3.21 | 107 | 139 | 398 | 12.5 | 15.4 | 36.7 |
| | 425 | 0.93 | 3.24 | 71 | 112 | 490 | 7.53 | 11.5 | 42.9 |
| | 450 | 0.93 | 3.17 | 69 | 144 | 477 | 7.15 | 14.1 | 41.4 |
| | 475 | 0.93 | 3.15 | 56 | 113 | 474 | 5.72 | 10.9 | 40.4 |
| | 500 | 0.93 | 3.13 | 56 | 138 | 389 | 6.29 | 13.7 | 34.1 |
| | 525 | 0.93 | 3.22 | 35 | 111 | 304 | 3.69 | 10.8 | 26.9 |
| | 550 | 0.93 | 3.11 | 28 | 80 | 123 | 2.89 | 7.58 | 11.1 |

TABLE II

| Cathode | Temp | Current | $V_p$ | $t_{90}$ | $t_{80}$ | $t_{70}$ | $ED_{90}$ | $ED_{80}$ | $ED_{70}$ |
|---|---|---|---|---|---|---|---|---|---|
| $FeS_2$ | 450 | 1.0 | 2.10 | 1072 | 2330 | | 67.6 | 139 | |
| | 450 | 1.0 | 2.06 | 1143 | 2150 | | 79.7 | 142 | |
| $V_2O_5$ | 400 | 0.993 | 3.23 | 142 | 182 | 518 | 16.0 | 19.5 | 52.3 |
| | 425 | 0.995 | 3.26 | 145 | 201 | 404 | 16.5 | 21.7 | 41.3 |
| | 450 | 0.992 | 3.28 | 105 | 130 | 294 | 12.3 | 14.1 | 30.1 |
| | 475 | 0.993 | 3.28 | 84 | 209 | 310 | 9.63 | 22.7 | 31.8 |
| $MoO_3$ | 400 | 0.987 | 3.01 | 220 | 300 | 375 | 23.0 | 29.7 | 35.1 |
| | 425 | 0.985 | 3.05 | 225 | 289 | 302 | 23.8 | 28.9 | 29.0 |
| | 450 | 0.990 | 3.04 | 183 | 230 | 245 | 20.4 | 23.1 | 23.2 |
| | 475 | 0.987 | 3.02 | 141 | 165 | 179 | 14.8 | 16.4 | 16.8 |
| $Nb_2O_5$ | 400 | 0.985 | 2.03 | 74 | 253 | 447 | 5.2 | 16.9 | 28.1 |
| | 425 | 0.982 | 2.06 | 67 | 232 | 452 | 4.77 | 15.6 | 28.8 |
| | 450 | 0.988 | 2.07 | 79 | 208 | 396 | 5.59 | 14.0 | 25.1 |
| | 475 | 0.985 | 2.12 | 60 | 187 | 399 | 4.40 | 13.0 | 26.2 |

Examination of the data reveals that in comparison to $FeS_2$, the cathode material of this invention provides higher cell voltage. When compared to the other cathode materials in Table II, the lifetimes, energy densities and discharge profiles of the cathode material of this invention are superior to known cathode materials.

The cathode material of this invention is a polyanion. The polyanion is somewhat polymerized, thus being more massive than the simpler materials listed in Table II. Because of its size, the cathode material of this invention has little tendency to dissolve in the molten salt electrolyte and diffuse or migrate across the cell to the anode site. While massive, the material has a large electrochemical equivalence.

Various modifications may be made to the invention as described without departing from the spirit of the invention or the scope of the appended claims.

I claim:

1. A primary cell having an anode material, an electrolyte material and a cathode material wherein said cathode material, in the pre-discharge condition thereof, is $K_7(NiV_{13}O_{30})$.

2. A thermal cell in accordance with claim 1 wherein said anode material is lithium metal or an alloy of lithium.

3. The cell of claim 2 wherein said cathode material is in intimate admixture with an electrolyte material comprising at least one lithium salt.

4. The cell of claim 3 wherein said electrolyte material is LiCl/KCl eutectic.

5. The cell of claim 3 wherein said electrolyte material is LiF/LiCl/LiBr eutectic.

6. The cell of claim 3 wherein said electrolyte material is LiBr/KBr eutectic.

7. The cell of claim 2 wherein said anode material is a lithium/aluminum alloy containing about 20 to 24 weight percent lithium.

8. The cell of claim 2 wherein said anode material is a lithium/silicon alloy containing about 44 to 56 weight percent lithium.

9. The cell of claim 2 wherein said anode material is a lithium/boron alloy containing about 53 to 80 weight percent lithium.

10. A primary cell in accordance with claim 1 wherein said anode material is lithium metal and wherein said electrolyte material is a nonaqueous solvent.

11. The cell of claim 10 wherein said electrolyte material is an organic solvent.

12. The cell of claim 11 wherein said electrolyte material is acetonitrile.

13. The cell of claim 11 wherein said electrolyte material is propylene carbonate.

* * * * *

UNITED STATES PATENT AND TRADEMARK OFFICE
CERTIFICATE OF CORRECTION

PATENT NO. : 5,151,335
DATED : September 29, 1992
INVENTOR(S) : David M. Ryan

It is certified that error appears in the above-identified patent and that said Letters Patent is hereby corrected as shown below:

Column 2, line 63, insert --lithium plus-- after "of"
Column 3, line 58, change "i" to --I--.
Column 3, line 61, "vandate" should be --vanadate--.
Column 3, line 64, "NiSO<" should be --$NiSO_4$--.

Signed and Sealed this

Twenty-eighth Day of September, 1993

Attest:

BRUCE LEHMAN

Attesting Officer

Commissioner of Patents and Trademarks